(12) United States Patent
Freelon (10) Patent No.: US 12,436,117 B2
(45) Date of Patent: Oct. 7, 2025

(54) SPIN-RESOLVED ULTRAFAST ELECTRON DIFFRACTION

(71) Applicant: UNIVERSITY OF HOUSTON SYSTEM, Houston, TX (US)

(72) Inventor: Byron Freelon, Houston, TX (US)

(73) Assignee: University of Houston System, Houston, TX (US)

( * ) Notice: Subject to any disclaimer, the term of this patent is extended or adjusted under 35 U.S.C. 154(b) by 383 days.

(21) Appl. No.: 18/129,723

(22) Filed: Mar. 31, 2023

(65) Prior Publication Data

US 2023/0314348 A1   Oct. 5, 2023

Related U.S. Application Data

(60) Provisional application No. 63/326,591, filed on Apr. 1, 2022.

(51) Int. Cl.
| | |
|---|---|
| *G01N 23/20058* | (2018.01) |
| *G01N 23/20008* | (2018.01) |
| *G01N 23/205* | (2018.01) |
| *G01N 23/2055* | (2018.01) |
| *H01J 37/295* | (2006.01) |

(52) U.S. Cl.
CPC . *G01N 23/20058* (2013.01); *G01N 23/20008* (2013.01); *G01N 23/205* (2013.01); *G01N 23/2055* (2013.01); *H01J 37/295* (2013.01); *G01N 2223/413* (2013.01)

(58) Field of Classification Search
CPC ....... G01N 23/20058; G01N 23/20008; G01N 23/205; G01N 23/2055; G01N 2223/413; H01J 37/295; H01J 2237/06333; H01J 2237/06383; H01J 37/073
See application file for complete search history.

(56) References Cited

U.S. PATENT DOCUMENTS

| | | |
|---|---|---|
| 2010/0108883 A1 | 5/2010 | Zewail |
| 2011/0089397 A1 | 4/2011 | Ujihara |
| 2021/0051794 A1 | 2/2021 | Rakitzis et al. |

OTHER PUBLICATIONS

Ahmed h. zewail, four-dimensional electron microscopy, Apr. 9, 2010, american association for the advancement of science, pp. 187-193 (Year: 2010).*

Kuwahara, M. et al. "Phase-locking of oscillating images using laser-induced spin-polarized pulse TEM." Microscopy 62(6): 607-614 (2013). doi:10.1093/jmicro/dft036.

International Search Report dated Aug. 24, 2023 issued in counterpart International PCT application No. PCT/US2023/017190.

* cited by examiner

*Primary Examiner* — Robert H Kim
(74) *Attorney, Agent, or Firm* — Blank Rome LLP (57) ABSTRACT

A device and system for ultrafast electron diffraction is disclosed. The electron diffraction device includes an electron source, anode, and magnetic lens. A laser probe pulse interacts with electrons from the electron source to generate an electron probe pulse that passes through the anode and diffracts from a sample yielding a diffraction pattern. Data is configured to be collected at one instance using the diffraction pattern to yield a first snapshot of diffractive information. Snapshots may be merged to produce an atomic stroboscopic motion image history of atomic lattice changes. The electron source may include a gas jet with photoionizable noble gas atoms to produce photoionized, spin-polarized electrons to form the electron probe pulse when the laser probe pulse impinges upon the electron source.

18 Claims, 6 Drawing Sheets

SPIN-RESOLVED ULTRAFAST ELECTRON DIFFRACTION

CROSS REFERENCE TO RELATED APPLICATIONS

This application claims priority to U.S. provisional patent application No. 63/326,591, filed on Apr. 1, 2022, which is hereby incorporated herein by reference in its entirety.

GOVERNMENT SPONSORSHIP

This invention was made with government support under FA9550-21-1-0237 awarded by the U.S. Air Force Office of Scientific Research. The Government has certain rights in the invention.

TECHNICAL FIELD

The embodiments disclosed herein are in the field of electron diffraction systems. More particularly, the embodiments disclosed herein relate to spin-resolved ultrafast electron diffraction devices and systems which, inter alia, may detect spin-resolved ultrafast dynamical motion of atoms.

BACKGROUND

One of the grand challenges in experimental science is to directly watch atomic motion as it affects material changes, i.e., to literally watch atomic motions as they occur. Under this approach to the study of materials, ultrafast light pulses are used to excite materials into a non-equilibrium phase. By exciting transient properties in a non-equilibrium state, then studying the equilibration process, it possible to obtain information about the material that is valuable to material physicists and engineers.

The most intractable material properties are difficult to understand because of the correlation of quantum properties. The effect of electron correlation leads to the emergence of complexity in materials that may be characterized by very sensitive links between the basic quantumparameters such as charge (C), spin (S), orbit (O) occupation and the atomic lattice (L) positions. Changing one of these parameters can result in enormous changes in the others, which in turn, can produce striking properties such as colossal magnetoresistance, charge densitywaves, high-temperature superconductivity and decoherence of quantum spin states. Understanding electron correlation is a major focus of condensed matter physics research.

The primary methodology for observing ultrafast, non-equilibrium events is pump-probe spectroscopy in which a laser pulse excites (i.e., pumps) a material into an excited state. Pico- or femtoseconds later, another femto-second pulse measures (i.e., probes) a transient physical property resulting from the photo-excitation. Pump-probe spectroscopies can provide faster experimental time resolution than the most advanced electronic instrumentation. This is because the pump-probe time-resolution is based on the use of optical delay stages which allow the probe pulse to interrogate samples at different times along the evolutionary path of a physical event. Importantly, optical delay stages allow the observation of event intervals that are separated by time intervals on the order of femtoseconds (e.g., $10^{-15}$ seconds).

Since the discovery of the diffraction of electrons from the atomic planes of solids, electrons have revealed a broad range of imaging, spectroscopic and diffractive information about the arrangement of atoms in solids. Electrons have de Broglie wavelengths that are smaller than atomic spacings rendering them appropriate for diffraction from periodically spaced atomic layers. Furthermore, electrons have a differential scattering cross section that is $10^6$-$10^8$ times greater than that of x-rays or neutrons. Therefore, electrons can diffract from small sample volumes. However, the electron's strong interaction with matter demands that the sample thicknesses be typically 10-$10^2$ nm to allow transmission of incident and diffracted electrons. Electron diffraction's most common application is transmission electron microscopy (TEM). While TEM has become a workhorse of materials science, it only provides a static measurement of atomic structure.

When an electron that is bound to an atomic nucleus is exposed to a laser pulse, it may absorb photons. If the energy of the photons hv, where h is Planck's constant ($4.136 \times 10^{-15}$ eV·s) and v is the wavelength of the laser, or the intensity of the laser pulse is high enough, the electron may be ionized and released into the continuum with a kinetic energy that depends on the release mechanism. In some instances, the electron may even be forced back toward its atomic nucleus, under the combined influence of the Coulomb force from the atomic nucleus and the laser electric field, and re-scatter off of the atom before reaching the continuum. Understanding these ionization processes and the energy of the ionized electrons is a large part of current atomic physics research. The conventional method for accurately measuring the energy of released photoelectrons is to measure their time of flight over a specific distance.

Recently, the spin of electrons that have been photoionized from noble-gas atoms by non-adiabatic tunnel, above the threshold ionization. The potential for producing photoionized, spin-polarized photoelectrons and their potential applications, ranging from probing magnetic structures to detecting molecular chirality, has attracted growing attention.

As an example, quantum computing requires specialized materials in order to realize actual computation devices. A very promising class of materials is low-dimensional, atomically thin materials that can support the ultrafast control of emergent quantum mechanical properties by using electromagnetic (EM) radiation. Such materials may potentially test and tune their physical properties with ultrafast (femtosecond scale) EM light. In addition to the effect of Coulombic repulsion, these quantum materials harbor interactions between the quantum degrees of freedom such as charge (C), spin (S), orbital (O) occupation and atomic position within the lattice (L).

Interactions between quantum degrees of freedom is an important area for researchers and companies working in the field of spin-based quantum computing. In order to measure these effects, the experimental time-resolution must be ultrafast: on the order picoseconds (e.g., $10^{12}$ seconds) to femtoseconds (e.g., $10^{-15}$ seconds). Importantly, the duration of the excitation pulse and the measurement interval, i.e., the experimental time-resolution, must be short compared with the duration of the ultrafast physical processes.

Thus, it is desirable to provide a spin-resolved ultrafast electron diffraction device and system that may overcome limitations in current techniques by providing a novel tool to acquire additional material information.

SUMMARY

In one aspect, embodiments are directed to an electron diffraction device that includes an electron source and anode. A laser probe pulse interacts with electrons from the electron source to generate an electron probe pulse that passes through the anode and diffracts from a sample yielding a diffraction pattern. Data is configured to be collected at one instance using the diffraction pattern to yield a first snapshot of diffractive information. Snapshots may be merged to produce an atomic stroboscopic motion image history of atomic lattice changes. The electron source may include a gas jet with photo-ionizable noble gas atoms to produce photoionized, spin-polarized electrons to form the electron probe pulse when the laser probe pulse impinges upon the electron source.

In another aspect, embodiments are directed to an ultrafast electron diffraction system that includes an ultrafast laser that generates a laser beam, a beam splitter configured to split the laser beam into a laser pump pulse and a laser probe pulse, and a sample stage configured to hold a sample. The laser pump pulse is configured to excite the sample. The system also includes a delay stage to modify a distance the laser pump pulse travels from the beam splitter to the sample to establish a delay time between the laser pump pulse and an electron probe pulse. The system includes an electron diffraction device with an electron source and an anode. The laser probe pulse interacts with electrons from the electron source to generate the electron probe pulse that passes through the anode and diffracts from the sample yielding a diffraction pattern. Data is configured to be collected at one instance using the diffraction pattern to yield a first snapshot of diffractive information. Snapshots may be merged to produce an atomic stroboscopic motion image history of atomic lattice changes. The electron source may include a gas jet with photo-ionizable noble gas atoms to produce photoionized, spin-polarized electrons to form the electron probe pulse when the laser probe pulse impinges upon the electron source. The system may further include a Mott spin polarimeter and/or a velocity map imaging (VMI) spectrometer.

These and other advantages of the present invention will become more fully apparent from the detailed description of the invention herein below.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown in the figures.

DETAILED DESCRIPTION

It is to be understood that the figures and descriptions of the present invention may have been simplified to illustrate elements that are relevant for a clear understanding of the present embodiments, while eliminating, for purposes of clarity, other elements found in a typical electron diffraction system, or typical method of using an electron diffraction system. Those of ordinary skill in the art will recognize that other elements may be desirable and/or required in order to implement the present embodiments. However, because such elements are well known in the art, and because they do not facilitate a better understanding of the present embodiments, a discussion of such elements is not provided herein. It is also to be understood that the drawings included herewith only provide diagrammatic representations of the presently preferred structures of the present invention and that structures falling within the scope of the present embodiments may include structures different than those shown in the drawings. Reference will now be made to the drawings wherein like structures are provided with like reference designations.

Before explaining at least one embodiment in detail, it should be understood that the concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other embodiments of devices, systems, methods, features, and advantages described herein will be or become apparent to one with skill in the art upon examining the drawings and the detailed description herein. It's intended that all such additional devices, systems, methods, features, and advantages be protected by the accompanying claims.

In general, embodiments are directed to a comprehensive experimental tool, termed "spin-polarized ultrafast electron diffraction," that will detect spin dynamics details in both topological and strongly correlated electron systems. Embodiments provide the ability to simultaneously measure spin- and time-resolved lattice dynamics to establish a novel approach to the difficult problem of disentangling charge (C), spin (S), orbital (O) and lattice (L) quantum channels of correlated materials.

Ultrafast Electron Diffraction (UED) inherently provides time-resolved structural knowledge of a material. The structural information may be related to physical processes involving CSOL and, in certain cases, UED data may be analyzed to determine specific C or O dynamics. UED's sensitivity to lattice position and phonon amplitudes is very high, with values that may approach 0.0006 Å. Therefore, if the quantum degrees of freedom are involved in producing the atomic motion, it is likely that UED can detect it. While UED is an excellent tool for providing the details on atomic arrangement, a number of the most intractable phenomena in condensed matter physics may be intimately related to the magnetic spin of atoms. UED alone is limited in its ability to provide spin-resolution of lattice motions.

Embodiments disclosed herein include spin-resolved UED to provide femtosecond time-resolved atomic dynamics information as a function of electron spin. Spin-UED combines ultrafast optical spectroscopy, electron diffraction, and atomic physics in order to detect spin resolved ultrafast dynamical motion of the atoms.

Embodiments provide a tool for the investigation of electron correlation by exciting materials into a transient state in order to explore the related dynamics. Non-equilibrium processes typically occur on ultrafast timescales. If the experimental time resolution is faster than these events in accordance with embodiments, it is possible to time-order CSOL-driven degree of freedoms. In this context, time-ordering is equivalent to assigning causal relationships between CSOL parameters.

For example, embodiments may provide a novel time-resolved instrument to address the critical problem of understanding how L can destroy or help to preserve the spin (S) states in quantum computing materials. In other words, embodiments disclosed herein describe an instrument for the detection of spin-resolved lattice responses to determine the effect of atomic structure changes on the spin states in atomically thin materials. Such an effect of lattice geometry may also be measured as a function of dimensionality or material thickness.

Embodiments incorporate spin detection into a UED system in order to observe spin-dependent signals that are time-correlated with the phonon dynamics contained in measured diffraction patterns. To date, the inventors are not aware of spin-resolved ultrafast electron diffraction studies in solids. Well documented challenges are involved in creating polarized electrons and there have been numerous impediments to the deployment of spin sources in different areas of physics.

For example, there have been efforts to produce a spin-resolved transmission electron microscope resulting in a limited number of published reports. The reports indicate that state-of-the-art spin-TEM provides nanometer resolution of magnetization regions, but with only picosecond time resolution at best. Faster time resolution is desirable in order to observe femto-second time dynamics associated with CSOL interactions. Further, ultrafast TEM instruments are often limited because of the long electron bunch travel distances along TEM electro-optics columns. Embodiments disclosed herein overcome these limitations by implementing a spin-polarize electron source within a compact UED geometry.

Embodiments further enhance UED so that, by exciting transient properties of a material into non-equilibrium state, the influence of spin may be investigated during the decay back to an equilibrium state. As a result, certain CSOL details may be obtained such as electron-phonon coupling, charge fluctuations and, importantly, spin-phonon coupling and interaction mechanisms. The long-standing, grand-challenge-level problems of high-temperature superconductivity, colossal magnetoresistance and spin-decoherence in solids are believed to centrally involve interactions between the atomic lattice and spin dynamics.

For example, the preservation of spin qubit states in nitrogen-vacancy centers as a function of the atomic lattice environment is poorly understood, but critical to the future of quantum computing. Embodiments disclosed herein may address the timely and critical problem of determining how the spin-lattice interaction in 2D transition metal dichalcogenides (TMDs) affects spin decoherence and, ultimately, the quantum computing capabilities of the material. In other words, the development of quantum computing may be dependent on the understanding and controlling of spin decoherence.

Embodiments disclosed herein may be considered a time-resolved, photoexcited electron-phonon system in which the relaxational dynamics are set by the equilibrium self-energy so that the phonon frequency can be influenced by spin dynamics. In fact, in some materials, the orientation of the spin may drive the phonon behavior.

Embodiments disclosed herein may also provide materials science researchers the ability to link femtosecond electron spin to phonon behavior in magnetic materials such as metal, Huesler alloys, two-dimensional magnets and spintronics materials. Currently, there has been no demonstration of such spin-resolved, ultrafast electron diffraction measurements.

In embodiments disclosed herein, to provide a polarized electron source (PES), embodiments depart from the standard use of GaAs semiconductors for the production of spin-polarized electrons. Rather, embodiments employ electrons from a jet of noble gas atoms that are photoionized by circularly polarized, femto-second laser probe pulses. The polarization of the incident light field selectively ionizes spin up and spin down photoelectrons. Spin asymmetry is the common term that is used to define the distribution of up and down electron spins. Importantly, the spin asymmetry may be tuned to high values corresponding to spin polarization of 90% by using photoionization processes in accordance with embodiments disclosed herein.

As explained further below, embodiments employ a compact electron gun geometry and a femto-second laser, to achieve femtosecond time resolution of diffraction patterns. Embodiments achieve femto-scale temporal resolution by reducing the distance between the source of electrons and the sample. The compact scale of the gun piece enables the electron bunch pulses to traverse the UED with minimal pulse-width spread.

Embodiments disclosed herein provide an instrument for addressing whether a low-dimensional topological material may be suitable to serve as a host platform for quantum computing based on spin qubits. The decoherence of spin states is a key factor in determining whether a material can be used in the realization of a quantum computer. Quantum computations are performed with two-state spin arrangements or qubits. Qubits are typically deep-level defects in a host material. The defects are characterized by localized electronic levels and paramagnetic spin states. Defect-based spin qubits have been widely investigated, and the spin coherence time $T_2$ is an important figure of merit in quantum computing. This parameter indicates the time required for quantum error correction to be achieved by a computing system if a given number of computations (e.g., 104) are performed.

Optimizing $T_2$ is an active area of investigation of computer scientists, engineers, and physicists. In this regard, two dimensional (2D) materials, such as TMDs, are promising materials for use as quantum computer platforms. In addition, TMDs show tremendous practical promise due to the ease with which they can be handled and integrated into electronics structures. Furthermore, because of their reduced geometry, TMDs have less surface and internal atomic bonds that can serve as pathways to reduce $T_2$. Low-dimensional TMDs should have less structural connections that might perturb qubit spin states and cause them to decohere. Despite the relative structural simplicity of TMDs, the effects of lattice geometry and nuclear spins is still poorly understood. Spin-resolved UED in accordance with embodiments disclosed herein may be used to determine how the how spin-lattice relaxation sets limits for the spin-coherence time in the TMDs. Using ultrafast EM pump pulses, it may be possible to excite specific phonon modes on femto-second timescales.

The spin coherence can be intricately influenced by crystal geometry, nuclear spin, and dimensionality. Deep-level defects in semiconductor TMDs yield paramagnetic spin states that can be modeled in the following way. An electron, with spin S, sitting in a nuclear spin bath may be described by a central Hamiltonian $H=H_S+H_B+H_{S\text{-}B}$. In this central Hamiltonian, $H_S$ and $H_B$ are the electron spin and the nuclear spin bath, respectively, and $H_{S\text{-}B}$ represents the qubit-bath interaction. $H_B$ is the sum of the Zeeman energy and the dipolar interaction between nuclear spins. The dipolar interaction reflects magnetic noise fluctuations. Noise is mixed with the electron spin via the nuclear hyperfine interaction. It is believed that the presence of nuclear spins is important for controlling the decoherence of spin qubits.

Spin defects are disturbances in solids that exhibit localized spin states. Crystal geometry can influence this spin state because the energy scale of nuclear spin flip-flop transitions is proportional to $1/r^3$, where r is the distance between nuclear spins. The decoherence time $T_2$ is also affected the strength of the nuclear flip-flops and the number of transition channels.

Embodiments of spin-UED disclosed herein may directly interrogate the link between r and spin-polarization. For example, it has been suggested (theoretically) that interatomic spacing may significantly affect $T_2$. Therefore, embodiments may characterize the effect of lattice spacing on $T_2$ by measuring the spin-phonon coupling. For example, TMD materials such as $MoTe_2$ and $MoS_2$ layers are promising quantum computation host systems. Embodiments disclosed herein may determine the effect on $T_2$ as a function of thickness and the isotropic purity (nuclear spin concentration) of the layers. Such characterizations may ultimately be used to tailor $T_2$ in these and other materials.

In accordance with embodiments disclosed herein, spin-lattice coupling may be extracted through the time dependence observed in the structural Bragg diffraction intensity. Embodiments utilize the detection of the spin-UED signal using incident electron pulses that alternate between right- and left-circularly polarized (R/LCP) laser pulses in order to produce diffraction signals that are spin-polarization dependent. Accordingly, oppositely polarized electron spins will be diffracted in an alternating fashion. The electron scattering intensities $I_{RCP}$ and $I_{LCP}$ originating from RCP and LCP, respectively, may be compared using diffraction difference analysis. Diffracted intensities may be modeled with temperature-models and electron-phonon models in order to extract spin contributions to the diffraction intensity temporal response. As an example, because TMDs have a sizable spin orbit (SO) coupling, it is anticipated that Bragg peak behavior may be analyzed to compare spin-dependent changes. At low temperatures, the effect of spin may become observable as shifts in lattice parameters or collective phonon behavior.

Further, embodiments provide for an experimental program that can be applied to thin 2D materials with different material thicknesses. Currently, it is believed that 2D materials with lower thickness may support greater spin states for greater decoherence times. Embodiments disclosed herein may provide the means to determine optimal thicknesses based on a desired performance.

Figure 1:
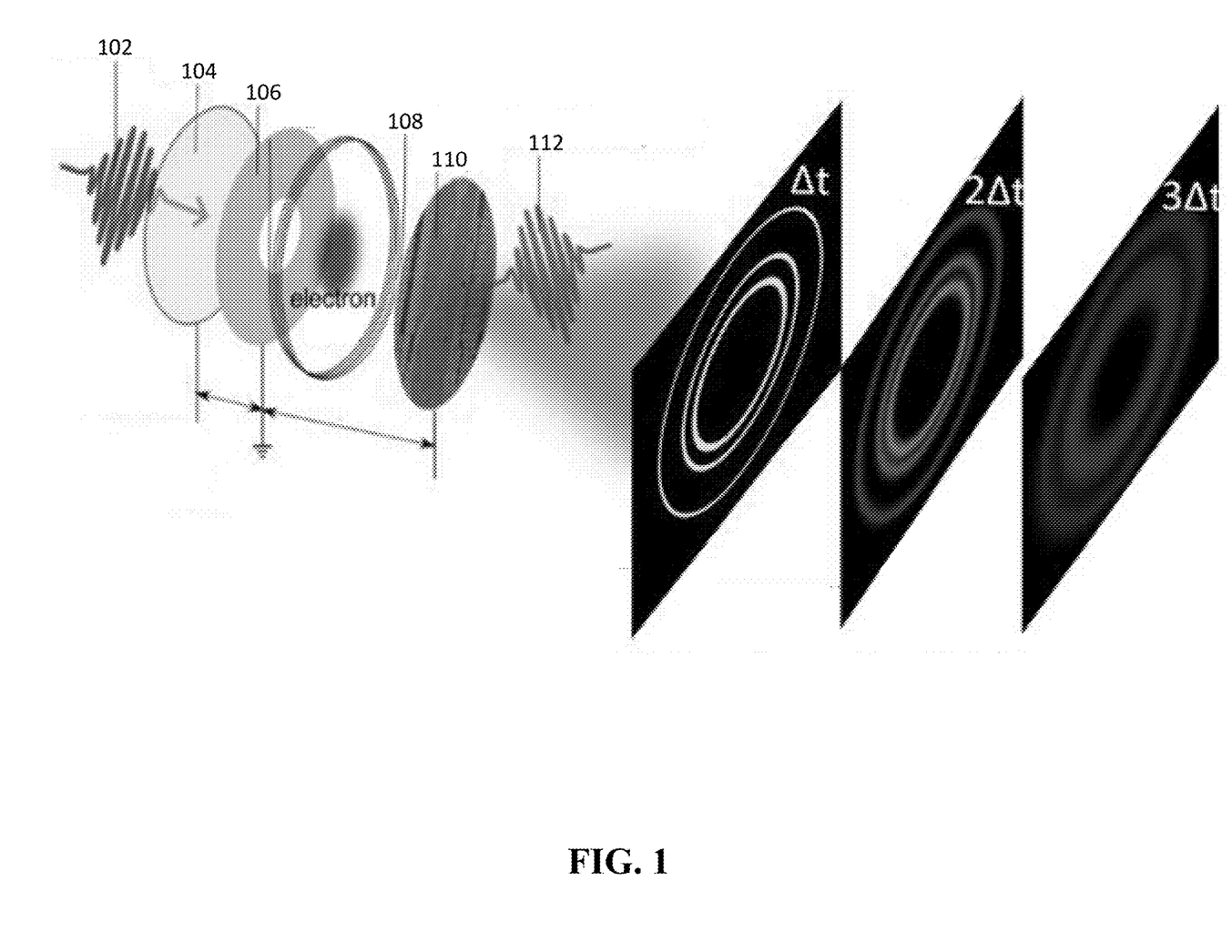
FIG. 1 is a perspective schematic diagram illustrating a compact ultrafast electron diffraction system in accordance with some aspects disclosed herein.

FIG. 1 is a perspective schematic diagram illustrating a compact ultrafast electron diffraction system in accordance with some aspects disclosed herein. As shown, a femto-second optical pulse 102 is directed to photocathode 104. The photocathode 104 is held at a high voltage to accelerate photoelectrons towards the grounded anode 106. The anode 106 includes an aperture for the accelerated electrons. Following the anode 106, the photo-accelerated electrons proceed to a magnetic lens 108, such as a magnetic solenoid lens, to focus the electrons to probe the sample 110. The sample 110 is excited by a femto-second excitation pulse 112, coordinated with the incident optical pulse 102. The probing of the elections of the sample 110 results in different diffraction patterns at different delay times (e.g., $\Delta t$, $2\Delta t$, $3\Delta t$ shown on the right side of FIG. 1).

In FIG. 1, the distance between the photocathode and the sample may be small (around an inch) in accordance with embodiments disclosed herein. This short distance reduces the time that is available for electron pulses to expand due to Coulomb repulsion (i.e., space charge effects). In order to obtain femto-second time-resolution, piezo-controlled optical delay stages are used to produce the time delay $\Delta t$ between the excitation and optical pulses. Accordingly, femto-second time-resolution may be obtained by the opto-mechanical stages, rather than relying on fast electronics. Using such delay stages makes it possible to vary an optical pulse's path length travel time on the order of femto-seconds. The diffraction images may be collected at different $\Delta t$ values of time delay. The diffraction data collected at different $\Delta t$ values may provide snapshots, at different times, of an atom's structural arrangements.

Achieving atomic-scale spatial resolution requires the electron pulsed beam to have sufficient transverse and longitudinal lateral coherence. These two types of coherence are achieved using the electron sources shown in FIG. 1. Accordingly, embodiments may provide dynamical structure information inherent to non-equilibrium processes. The spatial resolution that is achievable with embodiments may be sufficient to detect position change at the level of 1/70 of the proton radius.

Figure 2:
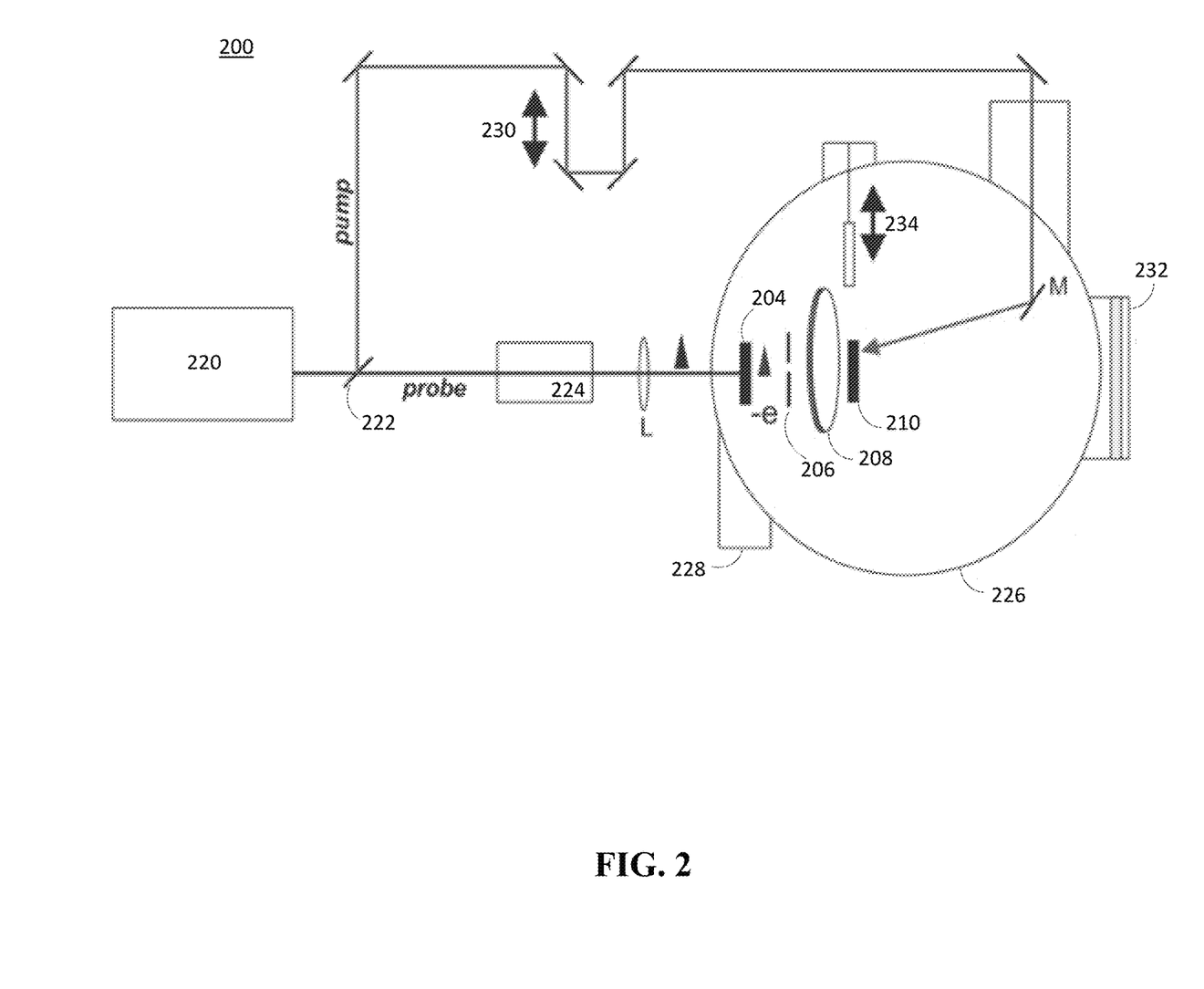
FIG. 2 is a schematic diagram illustrating a compact ultrafast electron diffraction system in accordance with some aspects disclosed herein.

FIG. 2 is a schematic diagram illustrating a compact ultrafast electron diffraction system in accordance with some aspects disclosed herein. The compact ultrafast electron diffraction system 200 of FIG. 2 demonstrates how ultra-short electron pulses are produced to provide a probe beam. In FIG. 2, the femto-second laser 220 incident on a beam splitter 222. The femto-second laser is, for example, a Ti:sapphire laser, and the beam splitter 222 may be an 80/20 beam splitter. The probe beam is directed through a third harmonic generation frequency tripler 224 to a photocathode 204 in a vacuum chamber 226. The vacuum chamber 226 includes a high-voltage feed through 228 to supply the high voltage to the photocathode 204. The vacuum chamber 226 also includes the anode 206, the magnetic lens 208, and sample 210. In this compact design, the photocathode to sample distance is ~1 inch. The excitation pulse is supplied from the beam splitter 222, through the optical delay stage 230, to the sample 210. The excitation pulse excites the sample 210 in a time correlated fashion relative to a diffraction pattern observed on a detector 232. For example, a CCD device, or phosphorescent screen coupled to a CCD device may be employed. A streak camera 234 may also be used to further monitor detected intensity as a function of time associated with the sample 210.

For example, Ti:sapphire ultrafast laser pulses (centered on $E=h\nu=1.5$ eV) may be directed onto a metallic photocathode to create photoemitted electron pulses. Upon photoemission, the electron's pulse has the same pulse-width as the incident laser pulse. The photocathode is held at high voltage, typically 30 kV, and the anode is at 0V. The electron pulses are accelerated through the anode's aperture due to the large potential difference. In order to preserve the electron pulse's short pulse-width, the distance between the photocathode and the sample is very small (approximately 1 inch). This short distance leads to a reduction in the time over which the pulse can spread due to Coulomb repulsion among its electrons. Accordingly, the femtosecond electron pulses provide a diffractive probe, while the femto-second light pulse excites the sample.

The synchronization of the optical (pump) and electron (probe) pulses enable dynamics to be observed, at different times, over the process in accordance with embodiments disclosed herein. The pump pulse beam excites the sample; a very short time later (on the scale of tens to several hundred femto-seconds), the electron pulse probes (diffracts from) the sample. The short time difference is the delay time i.e., the difference between the arrival of the pump pulse and probe at the sample. Data may be collected at a one instance to yield one snapshot of the dynamics. Next, the sample may be allowed to equilibrate, then the pump/probe actions may be repeated with a new delay time. Many diffraction snapshots may be collected at numerous delay times. The snapshots may be concatenated (merged) to produce a stroboscopic (or atomic motion picture) image history in which atomic lattice changes across the various diffraction patterns may be observed.

Figure 3:
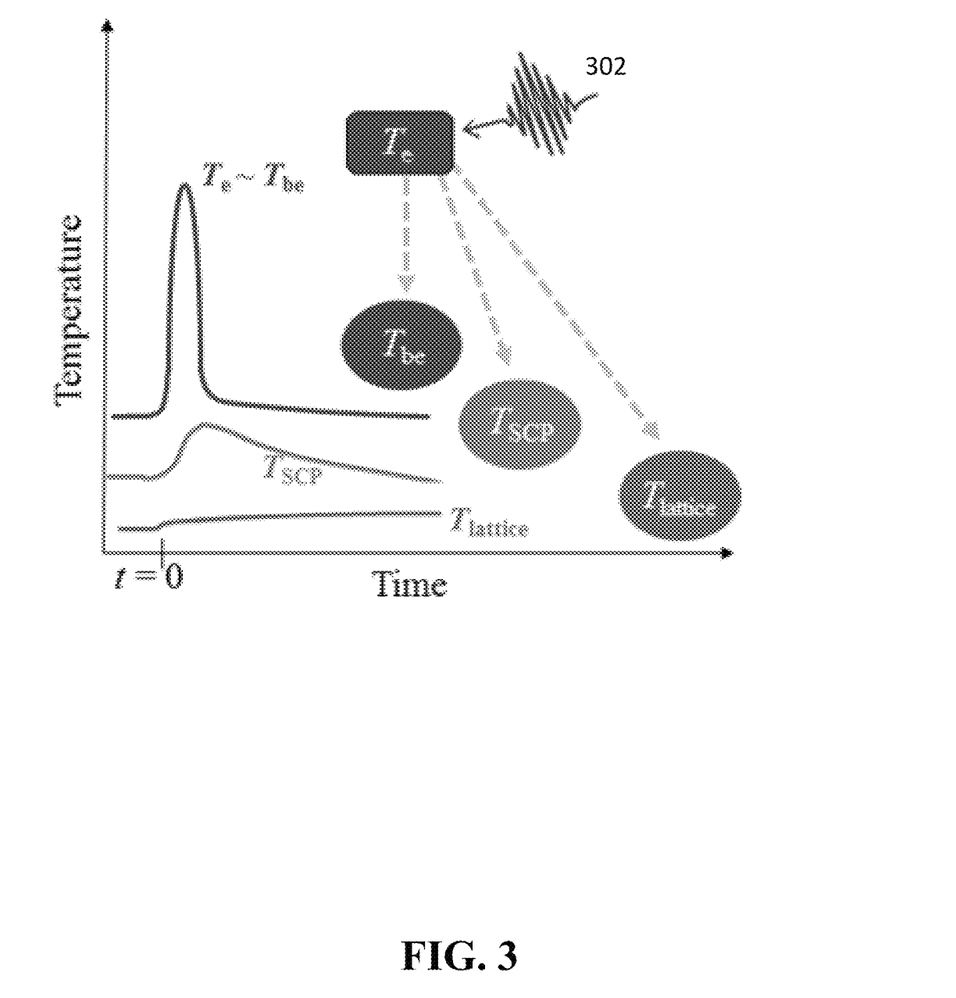
FIG. 3 illustrates time-dynamics of electronic and bosonic effective temperatures using an effective temperature model in accordance with some aspects disclosed herein.

In addition to providing a detailed atomic lattice information, embodiments disclosed herein may also provide data that can be used to disentangle electronic coupling between various degrees of freedom e.g., CSOL. For example, FIG. 3 illustrates time-dynamics of electronic and bosonic effective temperatures using an effective temperature model in accordance with some aspects disclosed herein. FIG. 3 demonstrates the timescales of the different ultrafast degrees of freedom that embodiments may probe based on the model. In FIG. 3, the pump beam 302 excites various changes in the interactions among different CSOL parameters at time t=0. The effective temperature model includes the exchange process between an electronic population at the temperature $T_e$ and bosonic (e.g., magnons and phonons) fluctuations at the effective temperature $T_b$. The model demonstrates the coupling of bosonic fluctuations of electronic origin at temperature $T_{be}$ and the coupling to both strongly coupled phonons (SCP) at temperature $T_{SCP}$ and the lattice at temperature $T_{lattice}$. Given the timescales of the different ultrafast degrees of freedom, UED based measurements may provide time-resolved structural knowledge related to the physical processes involving CSOL. For example, electron-phonon coupling, charge fluctuations and, importantly, spin-phonon coupling and interaction mechanisms. As such, embodiments provide a tool for challenging problems such as high-temperature superconductivity, colossal magnetoresistance and spin-decoherence in solids are believed to centrally involve interactions between the atomic lattice and spin dynamics.

Embodiments further incorporate spin detection into an UED system in order to observe spin-dependent signals that are time-correlated with the phonon dynamics contained in measured diffraction patterns. As previously noted, there has not been specific demonstration of spin-resolved ultrafast electron diffraction studies in solids. This is likely because of the challenges involved in creating spin polarized electrons.

To produce the spin-polarized electrons in the UED system, embodiments use a gas jet injector source to supply photo-ionizable noble gas atoms. The probe-femtosecond laser impinges upon the gas jet to cause photoionization. The resulting photoelectrons are spin-polarized by the strong laser field in accordance with embodiments disclosed herein. A photoelectron/photo-ion spectrometer may provide confirmation of the presence of the spatially separated distribution spin-polarized photoelectrons. In some embodiments, the spectrometer provides a benchmark and direct monitor of the creation of spin-polarized electrons. The spectrometer may confirm the ability to supply electrons for diffraction and provide verification of the ability to control the electrons' spin direction for diffraction.

Embodiments of the spin-UED are competitive with current state-of-the-art magnetic dynamics measurements currently performed with ultrafast X-ray diffraction (uXRD). Although spin-polarized electrons have been used to image magnetic microstructures at surfaces and in thin films, these are static methods. Spin-UED holds an advantage over uXRD because X-rays are only sensitive to charge. However, spin-polarized electrons are sensitive to multiple interactions such as charge, the spin-orbit and spin-spin interactions within the sample. Furthermore spin-UED has several technical and logistical advantages over uXRD, such as smaller samples sizes may be used and large user facilities are not required.

In embodiments disclosed herein, the spin of electrons is produced by photoionization from noble-gas atoms by non-adiabatic tunnel above the ionization threshold. Generally, the ionization of individual atoms is accomplished using laser pulses with high photon energies (hv greater than the atomic ionization potential), or focused pulses with high electric field magnitudes (as compared to the atomic binding electric field). The second case, known as strong field ionization (SFI), may occur when optically focused femto-second pulses are utilized with energies on the order of millijoules. This over-the-barrier SFI may be used to produce photoelectrons with different spins in accordance with embodiments disclosed herein.

Figure 4:
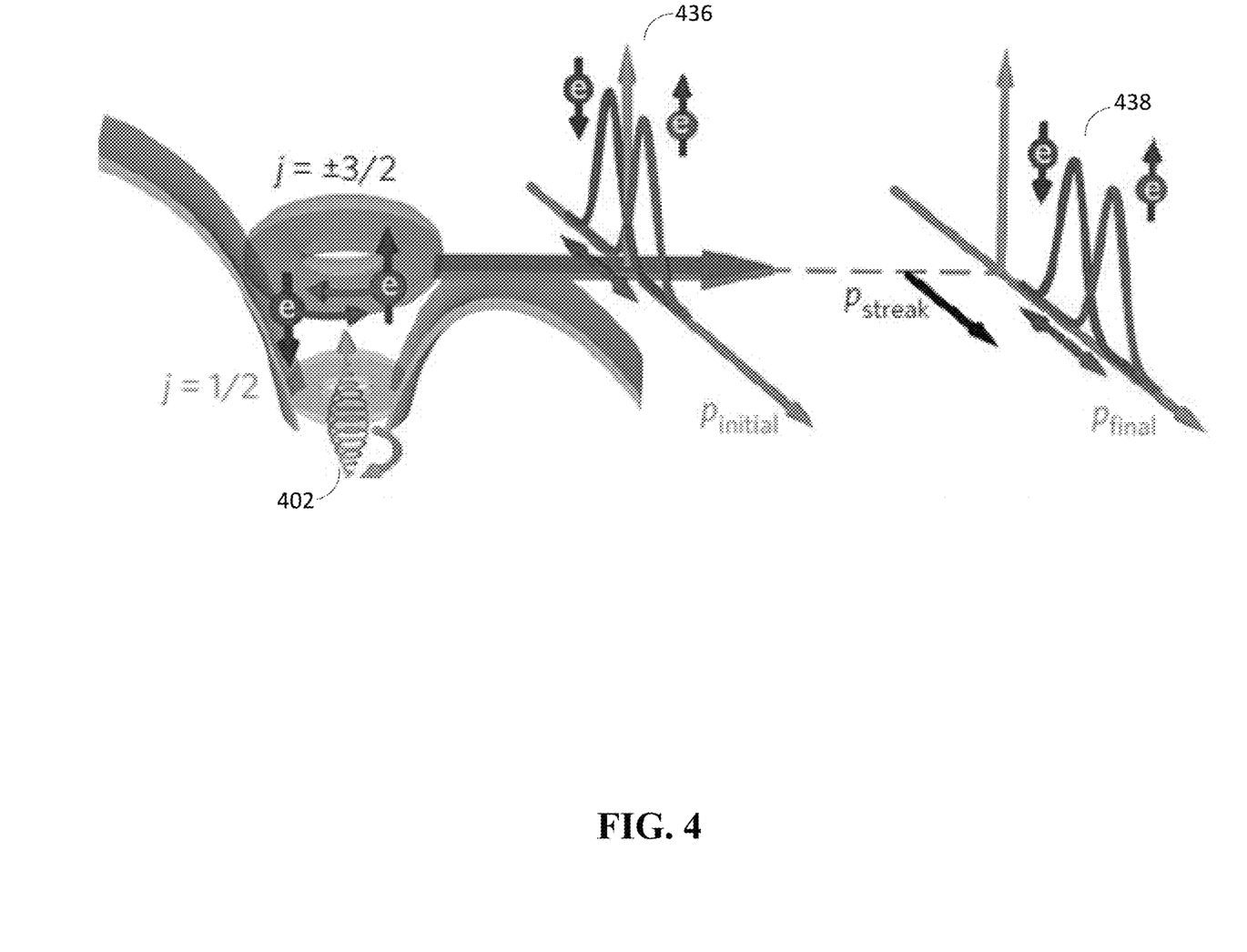
FIG. 4 is a schematic diagram illustrating femto-second laser-induced ionization of the Xe 5p state in accordance with some aspects disclosed herein.

To illustrate, FIG. 4 is a schematic diagram illustrating femto-second laser-induced ionization of the Xe 5p state in accordance with some aspects disclosed herein. The incident circularly polarized light 402 ionizes electrons into a state 436. The initial rotational state of Xe electrons results in an offset momentum imparted to electrons by the femto-second laser 438. Different spin states correlate with different shifted energy distributions 438 of the liberated electron. The shift is due to polarization of the laser bound electrons' momenta and spins. The different spin polarizations have well shifted kinetic energies in the continuum. Accordingly, embodiments disclosed herein provide well characterized spin polarized electrons for the diffraction measurements.

Figure 5:
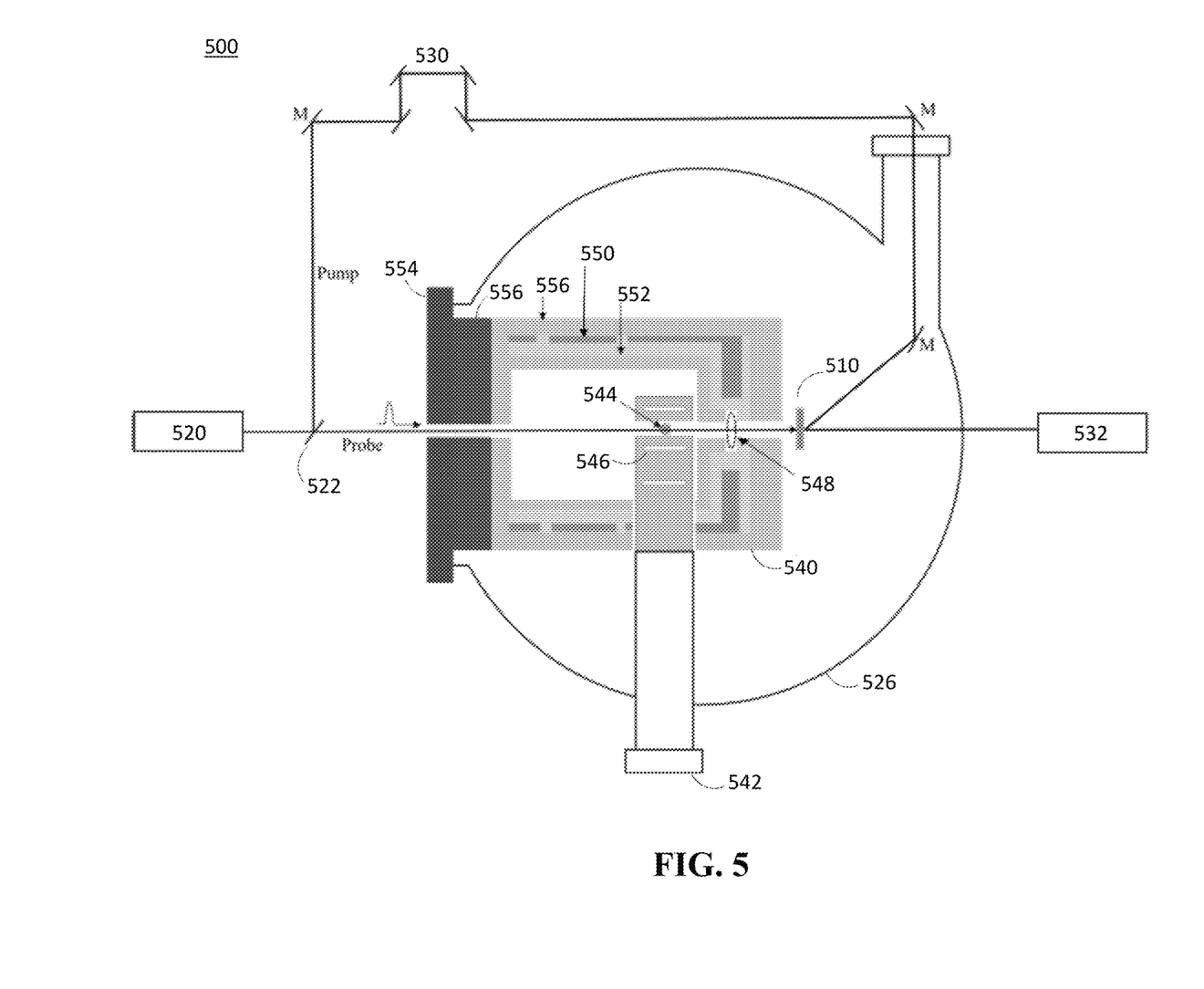
FIG. 5 is a schematic diagram illustrating a spin-resolved ultrafast electron diffraction system in accordance with some aspects disclosed herein.

FIG. 5 is a schematic diagram illustrating a spin-resolved ultrafast electron diffraction system in accordance with one or more embodiments disclosed herein. The system 500 of FIG. 5 integrates UED with an atomic beam that serves as a spin-polarized electron source. This is accomplished through the use of a gas jet introduced into a compact, DC HV photo-electron gun 540. In the example of FIG. 5, a velocity map imaging (VMI) spectrometer 542 is employed to confirm the production of spin-resolved photoelectrons.

In accordance with embodiments, an ultrafast laser 520 produces a linearly polarized laser pulse (e.g., 800 nm, 100 femto-second pulse-width) that is directed to a beam splitter 522. The beam splitter 522 splits the beam into the pump beam and a probe beam. The probe beam is directed into a non-linear crystal (not shown) to produce circularly polarized (CP) light. The CP light pulses are focused into the gas-beam interaction region 544 inside the gun 540 that contains a supersonic jet of noble gas atoms. The size of the interaction region 544 in which photoionization takes place is determined by the properties of the focused laser beam. Upon photoionization, the positively charged photo-ions are collected using an attractor plate contained in an ion optics electrodes stack 546.

The generated photoelectrons are accelerated towards an anode (not shown) structure that contains an aperture, similar to that shown in FIG. 2. The anode structure may be held at 30 kV DC to accelerate and collimate the electron beam. More specifically, the electrons may be accelerated using a high-stability, HV DC power supply connected to the anode with a mirror like surface finish.

FIG. 5 also includes a magnetic solenoid lens 548. The magnetic solenoid lens 548 of FIG. 5 is formed by a solenoid wire 550 with bobbin 552 of the electron gun 540. The magnetic solenoid lens 548 focuses the electron probe pulses onto the optical axis that intersects the detector plane of a charge-coupled camera device (CCD) 532.

In the embodiments of FIG. 5, the vacuum chamber 526 includes an electron gun 540 that is mounted on a high vacuum conflat flange 554 (e.g., 8-inch diameter) via a copper pedestal 556. The ion optics electrodes stack 546 and gas-beam interaction region 544 are internal to the electron gun's body 540. Photoelectrons that are produced in the gas-beam interaction region 544 are shielded from the solenoid wire's 550 magnetic field by mu-metal 556.

In addition to the CCD 532, photoelectrons may be directed to alternate locations. In order to confirm the creation of spin polarized electrons by the photoionization process, a VMI spectrometer 542 may be employed. In VMI techniques, the 3D energy distribution of photoelectrons is mapped onto a 2D detector plane; this provides the detection of completely liberated photoelectron distributions. Imaging the photoelectron momentum distribution is used to monitor and confirm the production of spin-polarized ionized electrons. Tuning (or gating) the momentum and the emitting angle of photoionized electrons can produce high spin polarizations with large spin asymmetries.

The VMI spectrometer 542 may be employed to directly measure such PMD gating. An image of PMDs is directly mapped to the spectrometer's imaging plane to reveal spatially separated spin-up and spin-down distributions.

Figure 6:
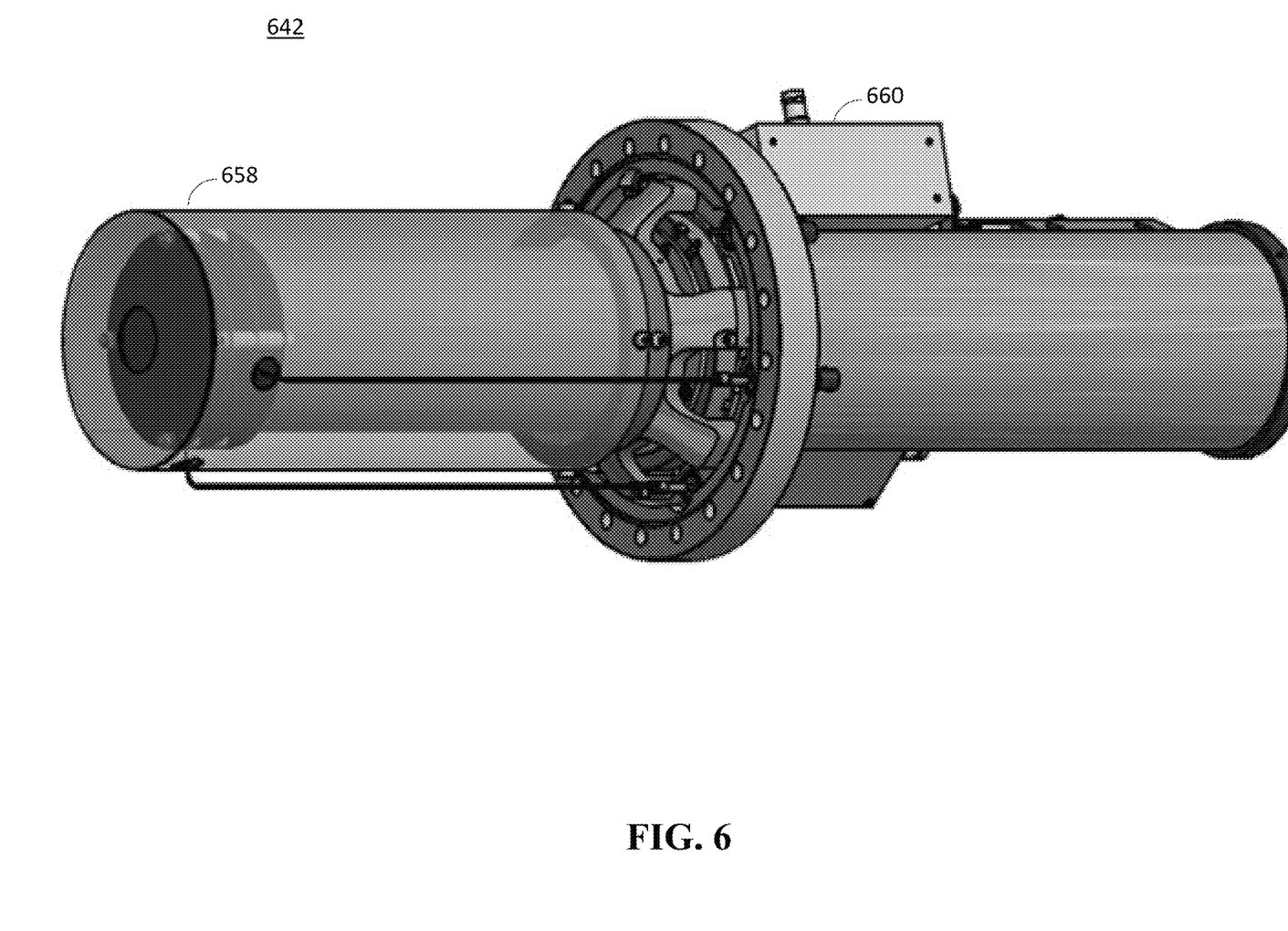
FIG. 6 is a CAD model diagram illustrating a velocity map imaging spectrometer in accordance with some aspects disclosed herein.

FIG. 6 is a CAD model diagram illustrating a velocity map imaging spectrometer in accordance with some aspects disclosed herein. The VMI spectrometer 642 includes three circular electrodes 658: a repeller plate, an extractor plate that features a hole through which the electrons pass, and a ground plate that has a somewhat larger hole. The ground plate is typically held at 0 V. The relative voltage ratio between the repeller and extractor plates determines the spectrometer's focusing and spatial imaging mode (e.g., a repeller-to-extractor ratio of ~0.98). When the repeller-to-extractor ratio is set between the extremes, the image produced on the VMI 642 is a convolution of the spatial and momentum profiles of the generated electrons.

The laser pulses may be focused into the VMI spectrometer 642 to achieve peak intensities ranging from $5 \times 10^{13}$ to $5 \times 10^{14}$ W/cm$^2$. The focused laser beam ionizes gas atoms at a target pressure of approximately $10^{-2}$ Torr. The three electrodes 658 drive photoelectrons towards a microchannel-plate-phosphor-screen detection system. A CCD camera records the image of the phosphor screen, which may be inverted to obtain a 2D slice of the cylindrically symmetric 3D momentum distribution. The photoelectrons trajectories can be simulated through software means.

In embodiments, a supersonic jet of gas atoms, such as Xe, serves as the source of ionizable material for the production of spin-polarized photoelectrons. The VMI spectrometer 642 includes a pulsed valve assembly 660 that serves as the gas jet source in accordance with some embodiments disclosed herein. The pulsed valve assembly 660 of the VMI spectrometer 642 includes a small size nozzle to enable the compact scale of the electron gun to be achieved. The pulsed valve assembly 660 is also designed to minimize increases in vacuum chamber's base pressure during the gas introduction.

In embodiments disclosed herein, the photoelectrons may be directed to a Mott spin polarimeter. Mott polarimetry may be deployed to measure spin polarization of both the photoionized and diffracted beams. The diffracted beams are weak compared to the incident or zero-order (transmitted) beams. However, the detection sensitivity of a Mott polarimeter is high enough to measure diffracted electron pulses. Typical ultrafast electron beams contain $10^3$ incident electrons per pulse (e$^-$/pulse). In these cases, the diffracted beam contains on the order of $10^2$ e$^-$/pulse. Considering that the pulse will arrive at the laser's repetition rate, such bunch charges lead to electron currents that are within the detection limits of commercially available Mott detectors. In modern, compact Mott detectors the detection efficiency $I/I_0 \sim 10^{-3}$ where I is the transmitted e$^-$ beam intensity and $I_0$ is the incident e$^-$ beam intensity. This leads to a detector efficiency figure of merit (FOM) of about $10^{-4}$. The spin detection may serve as both a monitor and a quantifier of the spin polarization produced by the electron source exchange scattering in accordance with embodiments disclosed herein. Relative polarization values can be extracted as a function of the ultrashort time interval. The Mott detector's signal is measured as an electrical current value.

In some embodiments disclosed herein, microchannel plates (MCP) may be used to directly image keV electrons by amplifying the flux of low-energy electrons inside an image intensifier. The intensified electron flux is converted by a scintillator to visible photons, which are subsequently, fiber-optically coupled to a high efficiency charge-coupled device (CCD) camera. In such systems, it is relatively straightforward to achieve single-electron detection due to the large gain of the MCP and the high light collection efficiency of the fiber-optics coupling. However, in order to further increase the photon yield per electron while minimizing costs associated with high-sensitivity cameras, a fluorescent screen with a high phosphor density may be employed. The fluorescent screen leads to a higher electron-to-photon conversion efficiency signal that is fed into the charge coupled device (CCD) camera.

When using embodiments disclosed herein, the sample preparation must be considered. It is important to detect and extract spin information from the experimental configuration. Accordingly, the thickness/transparency of the sample must be taken into account. Because of the high cross-section of non-relativistic electron scattering from solids, discernible diffraction patterns may be obtained in times less than one minute. Embodiments have the ability to reveal very subtle atomic shifts, as discussed above, that offers significant lattice dynamics information. This is combined with the extreme detection sensitivity of vibrational amplitudes as small as 1/70 of the radius of a proton in embodiments disclosed herein.

Embodiments disclosed herein provide a novel compact device and system for measuring spin-resolved ultrafast electron diffraction in materials. Such measurements will enable strategies for selecting optimal quantum computing materials comprised of few-layer transition metal dichalcogenides. Embodiments provide a benchmarking approach for potential quantum computing materials. Embodiments may provide information on the detailed spin-resolved lattice changes that can be used by theorists and experimentalists to better understand the fundamental physics of atomic lattice position influences on spin coherence times. Embodiments further have the advantage of providing interaction quantities that may be used to interpret and predict spin-tracking.

Features in any of the embodiments described above may be employed in combination with features in other embodiments described above, such combinations are considered to be within the spirit and scope of the present invention.

The contemplated modifications and variations specifically mentioned above are considered to be within the spirit and scope of the present invention.

It's understood that the above description is intended to be illustrative, and not restrictive. The material has been presented to enable any person skilled in the art to make and use the concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the embodiments herein therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An electron diffraction device comprising:
an electron source, wherein the electron source comprises a gas jet comprising photo-ionizable noble gas atoms that produce photoionized, spin-polarized electrons to form an electron probe pulse when a laser probe pulse impinges upon the electron source; and
an anode,
wherein the laser probe pulse interacts with electrons from the electron source to generate the electron probe pulse that passes through the anode and diffracts from a sample yielding a diffraction pattern; and
wherein data is configured to be collected at one instance using the diffraction pattern to yield a first snapshot of diffractive information.

2. The device of claim 1, wherein:
a second snapshot of diffractive information is collected at another delay time between the electron probe pulse and a subsequent laser pump pulse; and
the first snapshot and the second snapshot are merged to produce an atomic stroboscopic motion image history of atomic lattice changes.

3. The device of claim 1, further comprising: a magnetic lens positioned between the anode and the sample such that the electron probe pulse is transmitted through the magnetic lens.

4. The device of claim 1, wherein a distance between the electron source and the sample less than or equal to 1 inch.

5. The device of claim 1, wherein the device is disposed on a circular flange of a vacuum chamber.

6. The device of claim 5, wherein the circular flange has a diameter of ~8 inches.

7. The device of claim 1, wherein the diffraction pattern is collected using a charge-coupled device (CCD) detector.

8. The device of claim 1, wherein the diffraction pattern is collected using a phosphorescent screen coupled to a charge-coupled device (CCD).

9. An ultrafast electron diffraction system comprising:
an ultrafast laser that generates a laser beam;
a beam splitter configured to split the laser beam into a laser pump pulse and a laser probe pulse;
a sample stage configured to hold a sample, wherein the laser pump pulse is configured to excite the sample;
a delay stage to modify a distance the laser pump pulse travels from the beam splitter to the sample to establish a delay time between the laser pump pulse and an electron probe pulse;
an electron diffraction device comprising:
an electron source, wherein the electron source comprises a gas jet comprising photo-ionizable noble gas atoms that produce photoionized, spin-polarized electrons to form the electron probe pulse when the laser probe pulse impinges upon the electron source; and
an anode,
wherein the laser probe pulse interacts with electrons from the electron source to generate the electron probe pulse that passes through the anode and diffracts from the sample yielding a diffraction pattern; and
wherein data is configured to be collected at one instance using the diffraction pattern to yield a first snapshot of diffractive information.

10. The system of claim 9, wherein:
a second snapshot of diffractive information is collected at another delay time between the electron probe pulse and a subsequent laser pump pulse; and
the first snapshot and the second snapshot are merged to produce an atomic stroboscopic motion image history of atomic lattice changes.

11. The system of claim 9, the electron diffraction device further comprising: a magnetic lens positioned between the anode and the sample such that the electron probe pulse is transmitted through the magnetic lens.

12. The system of claim 9, wherein a distance between the electron source and the sample less than or equal to 1 inch.

13. The system of claim 9, further comprising: a Mott spin polarimeter configured to measure spin polarization of both the photoionized and diffracted beams.

14. The system of claim 9, wherein the electron diffraction device is disposed on ~8 inch diameter circular flange of a vacuum chamber.

15. The system of claim 9, the system further comprising: a velocity map imaging (VMI) spectrometer configured to confirm the production of spin-resolved photoelectrons in the electron probe pulse.

16. The system of claim 15, wherein the VMI spectrometer comprises: a pulsed valve assembly configured to provide a gas jet comprising photo-ionizable noble gas atoms that produce photoionized, spin-polarized electrons to form the electron probe pulse when the laser probe pulse impinges upon the electron source.

17. The system of claim 9, further comprising: a charge-coupled device (CCD) detector wherein to collect the diffraction pattern.

18. The system of claim 9, further comprising: a phosphorescent screen coupled to a charge-coupled device (CCD) to collect the diffraction pattern.

* * * * *